Patented June 8, 1943

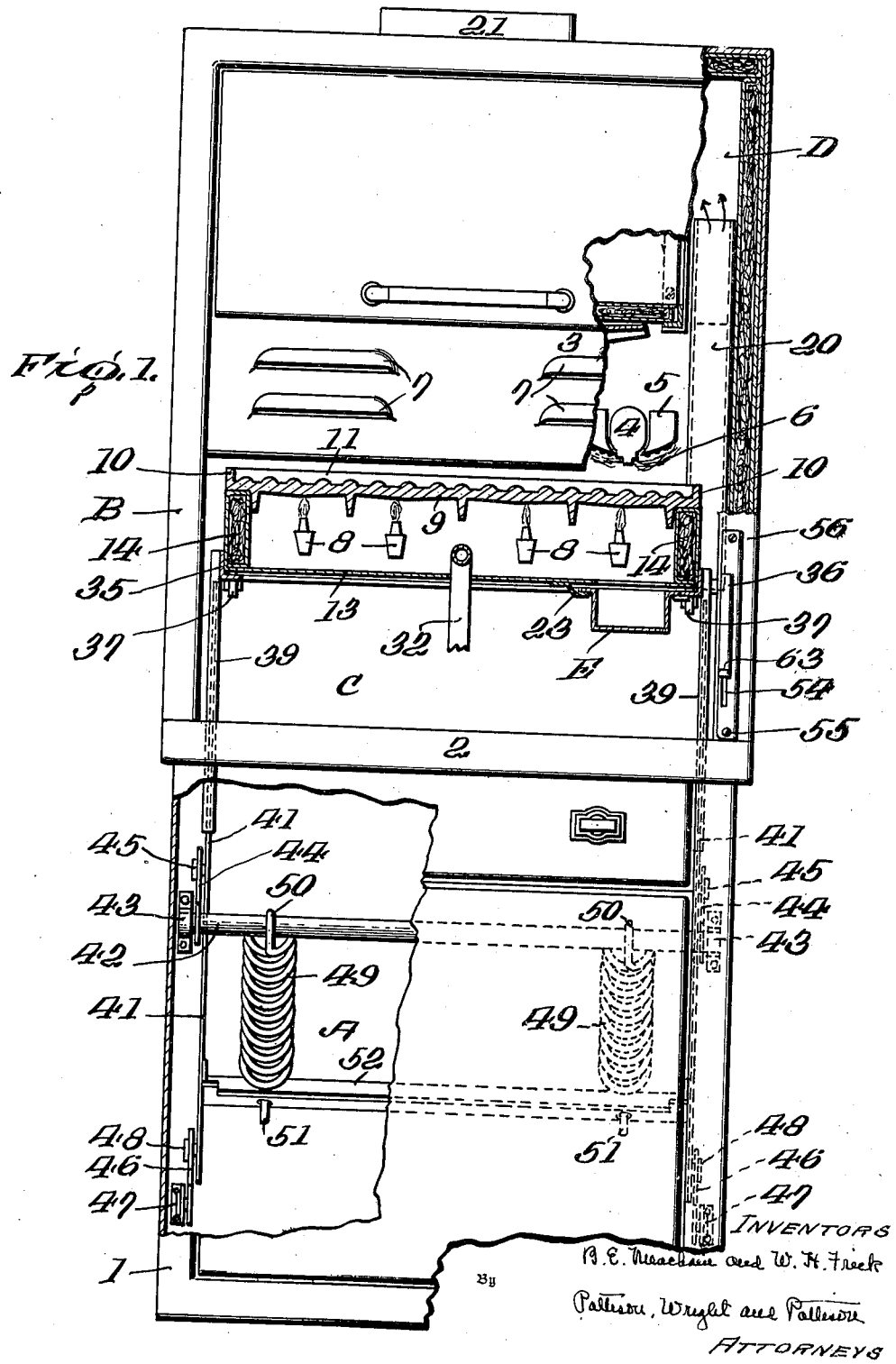

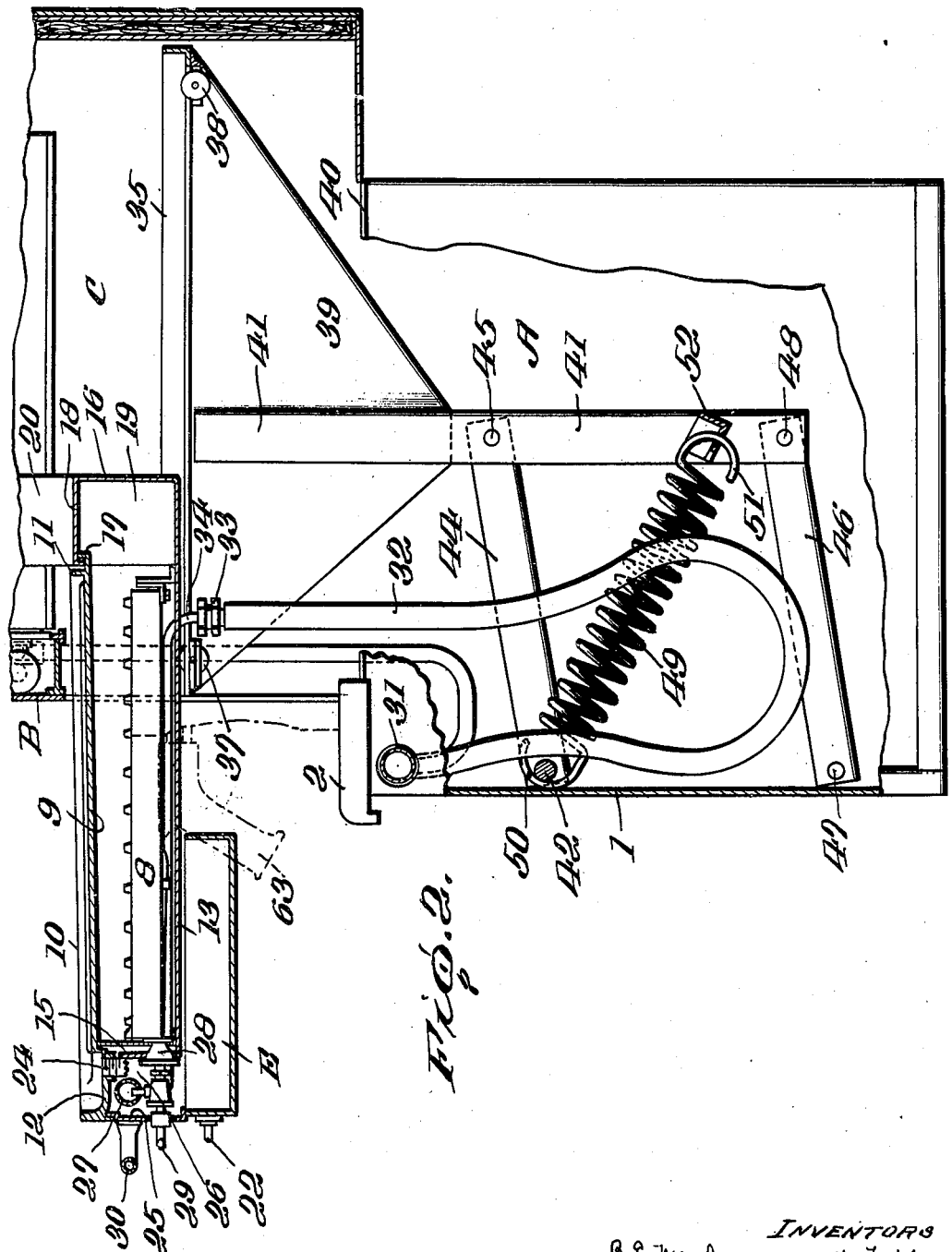

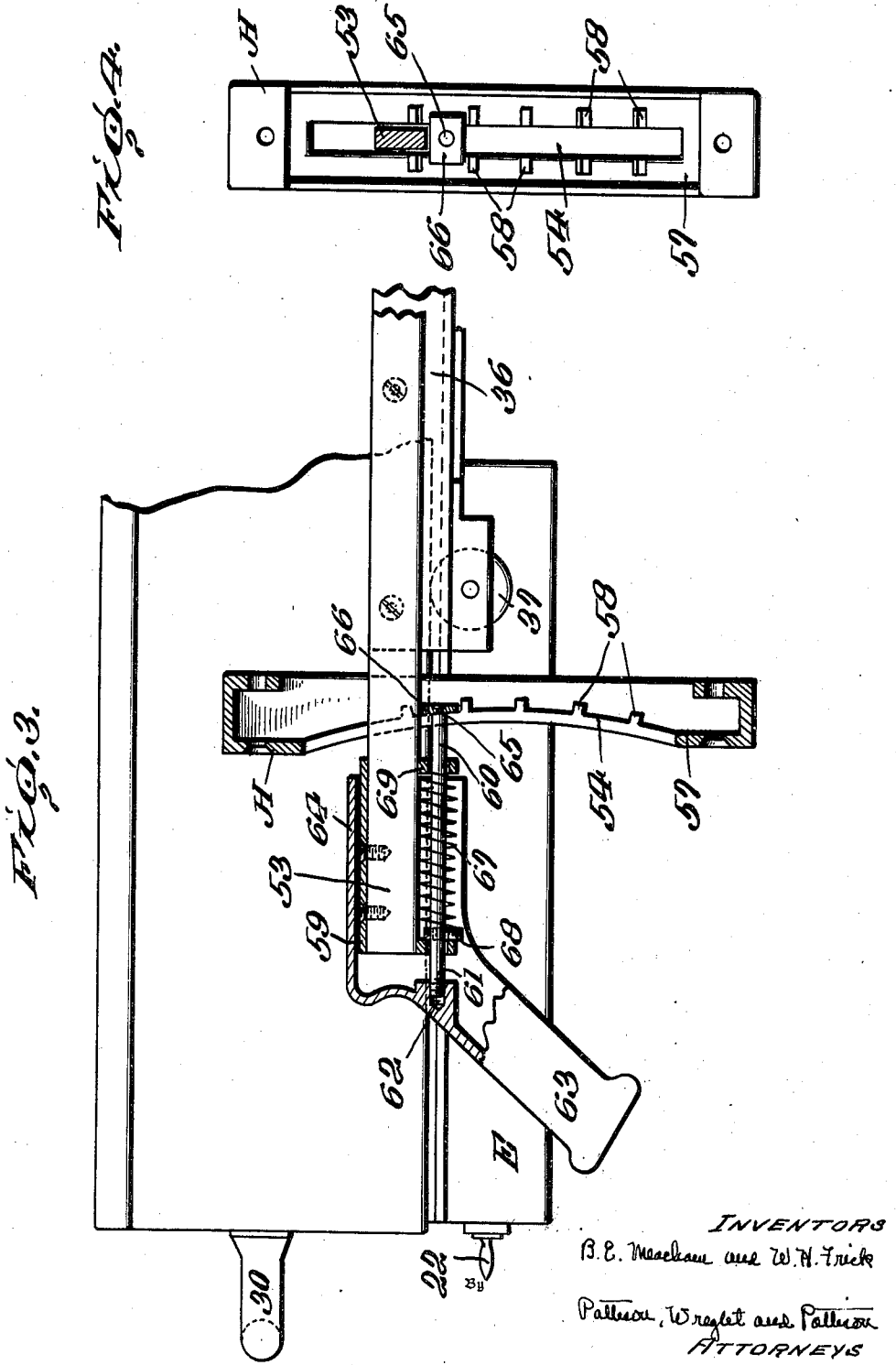

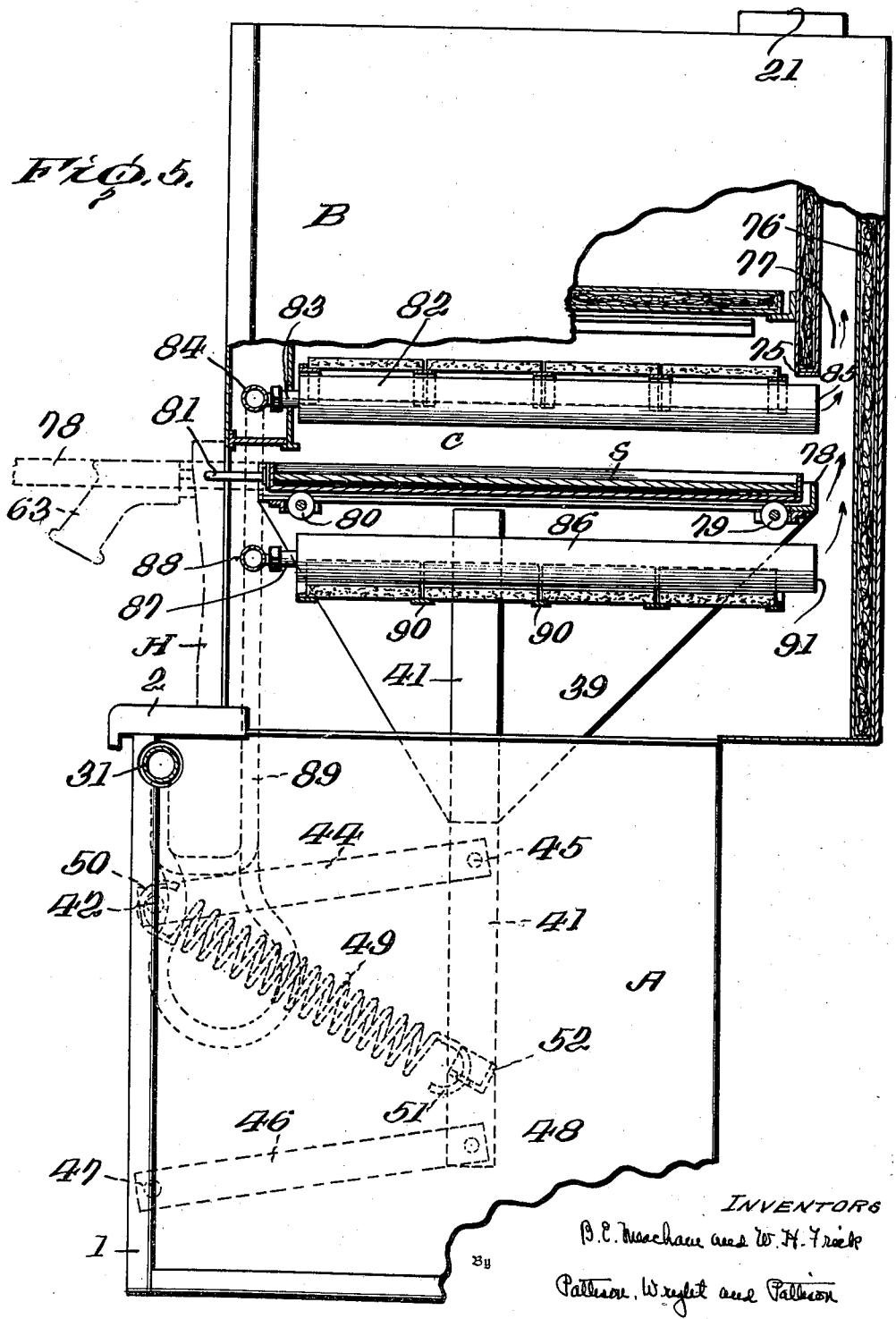

2,321,500

UNITED STATES PATENT OFFICE 2,321,500

COOKING APPLIANCE

Benjamin E. Meacham and William H. Frick, Cleveland, Ohio, assignors to American Stove Company, St. Louis, Mo., a corporation of New Jersey Application March 18, 1940, Serial No. 324,708

7 Claims. (Cl. 126—41)

This invention pertains to cooking appliances and deals more specifically with an elevating mechanism for use in conjunction with the broiler or broiling oven of the appliance.

In some instances broilers are provided only with top heat or top burners while in other instances broilers are provided with both top and bottom heat or burners, and the present invention is capable and suitable for use with either type of broiler.

The primary object is that of providing an improved elevating mechanism which is suitable for raising and lowering a broiler grid toward and away from the top heat or top burner but which is also equally suitable to serve as an elevating mechanism not only for the broiler grid but also for raising and lowering the bottom heating or burner unit, when one is provided, along with the broiler grid.

Still another object of the invention is to provide a construction in which either or both the broiler grid and bottom heating unit can be raised and lowered in respect to the top heating or burner unit and in which either or both the broiler grid and bottom heating unit can be moved horizontally outwardly and from under the top heating or burner unit.

Another object of the invention is that of providing a broiler and elevating mechanism in conjunction therewith which has the aforementioned attributes yet is comparatively simple and cheap of manufacture, easy and durable in operation, and highly efficient in results.

Other specific objects, novel features of construction and improved results of the invention will appear from a reading of the following description in conjunction with the accompanying drawings which are illustrative of one specific form in which the invention may be embodied.

In the drawings:

Figure 1 is a front view of a cooking appliance having a broiler in combination with which our improved elevating mechanism is illustrated, a portion of the view being broken away and being shown in vertical section to more clearly illustrate the invention.

Figure 2 is a vertical sectional view taken at right angles to Figure 1, with only the lower half of the cooking appliance being illustrated.

Figure 3 is a detailed fragmentary side view, partly in vertical section, illustrating the lock by which the elevating mechanism is secured in any one of a plurality of positions at which it may be set.

Figure 4 is a rear plan view of the locking mechanism illustrated in Figure 3 of the drawings.

Figure 5 is a side view of a modified form of the invention, a portion of the view being in vertical section.

In reading the following description it will be understood that the cooking appliance itself need not follow the construction illustrated in the drawings and that our improved elevating mechanism can consequently be applied to or used in conjunction with cooking appliances of varying constructions which have a broiler as a part thereof.

In the drawings the cooking appliance is illustrated as having an enclosed base which provides a housing A upon the upper end of which is superimposed a second housing B in the lower end of which is a broiler chamber C above which is superimposed a warming oven D. By reference to Figure 2 of the drawings it will be seen that the housing B is inset or set back from the front 1 of the lower housing A to provide a table-top-like portion 2 at the upper front end of the lower housing.

The broiler chamber C for the greater portion of its height has an open front end. A transversely extending panel 3 closes a portion of the upper front end of the oven chamber and behind this panel the top heating unit or burners 4 of the broiler are positioned. These burners need not be of any specific construction but in the drawings we have provided adjacent each burner a suitable radiant element 5 across the bottoms of which plays the flames 6 of the burners. We feel that a more efficient and better broiling operation is obtained by the provision of radiants. The panel 3 is provided with a plurality of louvre openings 7.

In Figures 1 and 2 of the drawings the broiler is provided with a lower heater which is in the form of a plurality of elongated burner arms 8. The broiler grid is illustrated as comprising a solid plate 9 having at its side and rear upwardly turned edges 10 and 11 respectively. At its front the grid is provided with a sump 12 for the reception of grease, meat juices or the like, and the grid 9 is consequently inclined from front to back so as to drain into the sump 12.

The particular broiler illustrated in Figures 1 and 2 of the drawings has a combined or unitary broiler grid and bottom heater. To provide this combination there is a drawer-like member which comprises a bottom 13 having upwardly extending and vertically disposed side walls 14, a front wall 15 and a rear wall 16. The broiler grid 9 is supported on the upper edges of the side walls 14 of the tray and the sump portion of the grid extends forwardly of the front wall 15 of the tray while the rear end of the grid stops short of the rear wall 16 of the tray. The space between the rear wall 16 of the tray and the rear end 17 of the grid is closed by a top wall 18 which is preferably formed as an integral part of the tray. The rear ends of the burners 8 stop short of the rear wall 16 of the tray with the result that at and extending across the rear end of the tray there is a flue 19. A vertically extending flue or stack-like member 20 communicates with one end of the transverse flue 19 of the tray and the upper end of this vertical flue discharges into the warming oven D and the heat and products of combustion discharged by it into the warming oven are in turn discharged through a suitable stack outlet 21 at the top and rear of the warming oven.

A grease collection drawer E provided with an operating handle 22 is slidably supported on the under side of the bottom 13 of the main tray as clearly illustrated at 23 and by reason of its manner of support can be readily removed from and reapplied to the tray when it becomes necessary to empty it. Grease, juice, and the like from the broiler grid sump 12 is conveyed to the grease collection tray by a suitable pipe 24.

A vertically disposed panel 25 is connected at its upper end to the front end of the broiler grid and is disposed in separated parallel relationship to the front wall 15 of the tray to provide a chamber 26 which extends completely across the front end of the tray and in this chamber is positioned a fuel supply pipe 27 which is suitably connected in conventional manner with the several inlet ends 28 of the intake manifolds of the burners 8. Fuel to each burner, which burners are incidentally preferably but not necessarily gas burners, is under the control of suitable valves the operating handles 29 of which are exteriorly positioned in spaced relation along the front of the aforementioned panel 25.

An operating handle 30 for the tray is provided and is secured to the panel 25.

A main gas supply manifold 31 is disposed within the lower or base chamber A and from it extends a flexible pipe or tubing 32 which is secured as at 33 to a rigid pipe or conduit 34 which has connection to the aforementioned fuel supply manifold pipe 27.

The tray, within which is positioned the several burners 8 and upon the upper end of which is disposed the broiler grid 9 and to the under side of which is secured the grease collection drawer E, is suitably mounted on a pair of angle-iron tracks 35 and 36 which extend from front to rear in the broiler chamber and in spaced parallel relationship to the side walls thereof. Each of these tracks has in its front end a roller 37 and in its rear end a roller 38. These rollers facilitate easy outward and inward movement of the tray by pulling or pushing upon the tray operating handle 30.

In Figure 2 of the drawings the position of the tray when pulled outwardly through the open front end of the broiler chamber is illustrated. Here it will be seen that the broiler grid and the bottom heat unit made up of the several burners 8 move as a unit outwardly from the open front end of the broiler oven and that the steak or other food being cooked upon the broiler grid can be readily inspected.

In addition to being slidable in a horizontal plane outwardly from the front end of the broiler oven the tray with the broiler grid and the bottom burners as a unit can be moved upwardly and downwardly in a vertical plane within the broiler chamber, in a manner which will now be described, so as to provide for selective positioning of the broiler grid in respect to the upper cooking burners 4. In carrying on a broiling operation it is desirable to be able to move the broiler grid which carries the food being cooked into selective positions in respect to the top cooking burners so as to better control the cooking operation. In the present invention this is not only possible but when the broiler grid is moved to and away from the upper or top cooking burners the position of the broiler grid in respect to the lower burners is maintained constant by reason of the lower cooking burners moving as a unit with the grid.

The track or runways 35 and 36 are freely movable in a vertical plane in the broiling chamber or oven and are supported by the elevating mechanism as will now be described. Each of the tracks 35 and 36 are secured to the upper end of a plate 39. These plates 39 are disposed in a vertical plane and are positioned in parallel separated relationship to the side walls of the broiler chamber and the side walls of the lower base chamber A. The plates extend downwardly through the top 40 of the base chamber A and to each of them is rigidly secured the upper end of a vertically extending arm 41. A shaft 42 extends across the front end of the base chamber A and has its ends supported in suitable journals or bearings 43. A pair of cross arms 44 have their outer ends rotatably supported on this shaft while their inner ends are pivotally connected as at 45 to the vertical arms or uprights 41 at a point intermediate the length of said arms. A second pair of cross arms 46 have their outer ends pivotally supported as at 47 on the walls of the base chamber A while their inner ends are pivotally connected as at 48 to the lower ends of the vertical arms or uprights 41. A pair of coil springs 49 have their one ends 50 connected to the transversely extending shaft 42 while their opposite ends 51 are secured to a horizontally disposed cross bar 52 which extends between and constitutes a brace for the pair of vertical arms 41. This cross brace 52 extends between the arms 41 at a point closely adjacent their lower ends.

It will be understood that the tracks or runways 35 and 36 can be moved upwardly and downwardly in the broiler chamber if a lifting or lowering pressure is exerted upon them. To accomplish a raising and lowering action of the tracks and the lower heating unit and broiler grid 9 as a unit and to lock or secure said tracks in any one of a plurality of set positions we provide the mechanism illustrated in Figures 3 and 4 of the drawings. The construction illustrated is merely illustrative of one device suitable for the purpose and it is to be recognized that other devices could be substituted without departing from the spirit of the invention.

Referring specifically to Figures 3 and 4 of the drawings it will be seen that one of the runways or tracks is provided with an extension arm or bracket 53 and that this bracket arm extends a considerable distance outwardly beyond the front of the range and passes through a vertically elongated opening 54 in a lock housing H which is suitably secured as indicated at 55 to the outer face of the upper stove front 56 at one of its sides. The front wall 57 of the housing through which is the aforementioned opening 54 is provided with a plurality of spaced outwardly extending and horizontally disposed lugs or shoulders 58. By reference to Figure 4 of the drawings it will be seen that these lugs are positioned at each side of the opening 54.

A sleeve 59 is rigidly secured to the outer end of the bracket 53 and extends downwardy beyond the bottom edge thereof and a plunger pin 60 is freely reciprocable in the sleeve. The outer end 61 of the plunger pin engages a socket 62 in a handle 63 which has a tubular portion 64 which telescopically receives and is freely reciprocable upon the sleeve 59 of the bracket arm 53. The inner end 65 of the pin extends through the opening 54 of the lock housing and carries an enlarged head 66 which is of a dimension too great to permit its passage outwardly through the opening 54. By reference to the drawings it will be seen that the head 66 is adapted to be selectively positioned into the spaces which exist between the aforementioned transversely extending lugs or shoulders 58 on the inner face of the lock housing. A coil spring 67 is mounted upon the plunger pin 60 intermediate its length and is mounted in the sleeve 59 in the extension portion thereof below the bracket arm 53 and has one end in engagement with an enlargement 68 carried by the pin while its other end is in engagement with the end portion 69 of the sleeve 59. This spring normally exerts a tension or pressure to hold the pin 60 with the head 66 thereof in engagement with the rear face of the lock housing wall 54. The spring therefore tends to hold the pin in a locked position in respect to any movement in a vertical plane as such movement would be prevented by the lugs or shoulders 58. However when an inward pressure is exerted upon the handle 63 this handle together with the pin are moved inwardly in respect to the range front and the head 66 of the pin is carried into a position where it will clear the lugs or shoulders 58 and permit the runways or tracks 35 and 36 to be raised and lowered by the application of proper lifting or lowering force upon the handle 63.

From the foregoing it will be seen that the tray which carries the lower burner or heating unit and the broiler grid can be elevated or lowered within the broiler chamber and can be locked in any one of a plurality of set positions to provide easy and rapid adjustment of the broiler grid in respect to the top heating burners or unit. It will be further seen and understood that by grasping the handle 30 the tray can be pulled outwardly from the broiler chamber or oven and that this can be accomplished irrespective of the particular vertical position or plane in which the tray is set.

When the tracks and tray are raised and lowered the cross arms 44 and 46 swing about their pivotal connections and they together with the coil springs 49 not only guide the tracks and tray in their movement but will also support them. The coil springs additionally act as a counter-balancing mechanism by making it unnecessary to exert an abnormal amount of energy upon the handle 63 when it is desired to elevate the tray. The coil springs additionally assist in preventing the tray and tracks descending too rapidly under the force of gravity when it is desired to lower them.

During any vertical or horizontal movement of the tray the flue outlet, made up of a horizontal flueway 19 and the vertical flue 20, for the burners constituting the lower heating or cooking element move as a unit with the tray. The flue arrangement is such that the products of combustion generated by the burners of the lower cooking element are by-passed or discharged beyond and above the burners constituting the upper cooking element so as to assure that these products of combustion will not detrimentally interfere with the proper operation of the burners of the upper cooking element as would occur if some provision were not made to discharge these products of combustion at some point remote from the upper cooking burners.

The broiler grid 9 is imperforate and as a consequence the products of combustion generated by the lower burners 8 must follow the flues 19 and 20 to escape. Thus the grid in combination with the flues prevent the products of combustion of the lower burners contaminating the secondary air delivered to the upper burners and prevent the lower burners from in any way interfering with the proper operation of the upper burners. It is for this reason that the grid is made to move as a unit with the tray rather than made separate so that the grid could be pulled horizontally outwardly from the broiler oven without at the same time bringing the lower burners out with it. Obviously if the grid alone were pulled out of the broiler chamber and from above the lower burners the products of combustion of the lower burners would be directed against and immediately into the flames of the upper burners and this would be particularly the case were the tray in its elevated position.

We recognize however that the advantages and improved results of our invention could be applied to a broiler which has top and bottom burners in such a way as to make it possible to pull the broiler grid out horizontally from the broiler chamber independently of the bottom burners. That is to say, there could be a construction in which the bottom burners and broiler grid are raised and lowered as a unit but in which the broiler grid alone can be pulled outwardly from the broiler oven to permit visual inspection of the article or articles being cooked on the grid.

As illustrative of only one construction of the nature immediately above referred to, reference should be had to Figure 5 of the drawings. Insofar as the construction of Figure 5 of the drawings has parts similar to those previously described in respect to the broiler construction appearing in Figures 1 and 2 of the drawings, similar reference numerals will be utilized and no specific detailed description will be given of the parts.

There is the same lower base chamber or compartment A, upper compartment B having a broiling oven C therein with a warming oven thereabove having the flue outlet 21. The broiler chamber has a rear wall 75 in spaced relation to the rear wall 76 of the upper compartment to form a flueway 77 for venting the products of combustion from the broiler chamber to the outlet flue 21.

The broiler grid is a pan-shaped imperforate member S supported at each of its side edges on a channel iron or track 78 each of which at its rear end is provided with a roller 79 and at its front end with a roller 80 to facilitate horizontal movement of the grid outwardly and inwardly through the open front end of the broiler chamber C by pulling or pushing upon the handle 81 attached to the outer front end of the grid.

In this instance each of the top cooking burners comprises a tubular element 82 into the front end of which extends a fuel inlet at 83 which receives fuel from a common supply conduit 84. In operation these burners burn a long tongue of flame which projects or travels through the tubes and the hot products of combustion escape from the rear ends 85 of the tubes and vent immediately upwardly into the flue passageway 77, as indicated by arrow.

The broiler grid tracks or runways 78 are supported upon an elevating mechanism which is identical with that described in the preferred form of the invention and comprises the triangular plates 39, the vertical arms or legs 41 from which extend horizontally disposed cross arms 44 and 46 which have the same pivotal connections 45 and 48 with the vertical arm at their inner ends and pivotal connection with the shaft 42 and pivot pins 47 at their outer ends. There is the same cross bar or brace 52 to which the lower end 51 of the coil springs 49 is attached while the opposite outer ends 50 of the springs are attached to the cross shaft 42.

The lower cooking burners are identical in construction with the upper burners in that each of them comprises an elongated horizontally disposed tube 86 having extending into its front end a fuel inlet 87 which is in communication with a fuel supply pipe or manifold 88. Fuel is supplied to the upper burner manifold 84 and the lower burner manifold 88 by a flexible conduit 89 having suitable connection with the main fuel supply pipe 31 which receives fuel from some suitable source of supply, not shown.

The lower burners and their tubes are suitably supported upon or suspended between the triangular plates 39 by resting upon and being secured to transversely extending bars 90 which span the space between the oppositely disposed plates 39. The lower burners vent their hot products of combustion out of the rear ends 91 of the tubes from which these products of combustion travel upwardly for escape through the flue passageway 77 as indicated by arrows.

The elevating and lowering handle and the means of locking the elevating mechanism in any one of a desired plurality of set positions is identical with that heretofore described, the lock housing H and the lock releasing and elevating handle 63 are illustrated in broken lines in this figure of the drawings.

It will be obvious that the broiler grid and the lower burners are raised and lowered as a unit but that the broiler grid itself can be pulled outwardly from the broiler oven independently of the lower burners. In this instance it is feasible to provide a construction which permits independent outward movement of the broiler grid because the upper broiler burners are of such a character that the hot products of combustion discharged from the lower broiler burners will not interfere with their proper operation. In other words, the presence of the broiler grid is not necessary as a protection to the upper broiler burners in respect to the products of combustion generated by the lower broiler burners.

It is to be recognized that other constructions than that illustrated in Figure 5 can be conceived which would permit the broiler grid to be pulled out of the broiler oven independently of the lower broiler burners and it is to be further understood that the particular type and construction of burners per se illustrated in Figure 5 of the drawings are not our invention but are used in this particular figure of the drawings merely to illustrate a construction which will permit our improved elevating mechanism to be used in a manner whereby the lower broiler burners and broiler grid can be raised and lowered as a unit and will also permit the broiler grid to be moved outwardly from the broiler oven independent of a similar movement of the lower broiler burners.

Departures in specific constructions from that illustrated in the drawings can be made without departing from the inventive concept and the invention is to be limited only within the scope of the hereinafter appended and following claims.

We claim:

1. An improved cooking appliance comprising, a broiling chamber having a burner in the upper end thereof and an opening at its front, a lower burner and broiling grid thereabove in the lower end of said broiling chamber and supported to be movable as a unit vertically in said broiling chamber, said unit having an arm extending outwardly beyond the front of said broiling oven, a lock housing having therein a vertically elongated slot and through which said extending arm of said unit passes, a handle on said unit arm by which said unit may be raised and lowered in said broiling chamber, said handle being movable on said unit arm toward and away from said lock housing, said handle provided with a lock head cooperating with said lock housing to support said unit in any one of a plurality of its vertically adjustable positions, resilient means normally holding said lock head in locked relationship with said lock housing, and said operating handle under pressure being movable inwardly on said unit arm against said resilient tension to release said lock head from said lock housing to permit vertical adjustment of said unit.

2. A construction such as defined in claim 1 wherein, said unit support is in the form of a trackway, and said unit is horizontally movable on said trackway to permit the unit in addition to being vertically movable within said broiler chamber to be moved horizontally in and out of the opening at the front of said chamber.

3. An improved cooking appliance comprising, a broiling chamber having an upper broiler burner and provided at one side with an opening, a pair of horizontally disposed tracks in said chamber one each of which is disposed at opposite sides of said opening, said tracks being mounted for vertical movement in said chamber, means to impart said movement to said tracks, a drawer supported on said tracks for movement therewith and being movable outwardly and inwardly on said tracks in respect to said chamber opening, a burner in said drawer, an imperforate broiler grid constituting a portion of the top of said drawer and being arranged at an inclination downwardly from its rear toward its front edge, a grease collection trough extending across the lower front edge of said grid and being movable therewith, a grease collection receptacle carried by said drawer and being positioned beneath the same, a conduit interconnecting said grease collection trough and said receptacle, and said receptacle being in the form of a drawer having quick sliding detachable connection with said burner carrying drawer.

4. A construction such as defined in claim 3 wherein, the outer end of the burner carrying drawer extends downwardly from the outer edge of the grease collection trough, a vertically disposed and transversely extending wall is positioned within said drawer adjacent the rear edge of said grease collection trough, said walls forming a housing the top closure of which is said grease reception trough, a fuel supply manifold in said housing, valves in said housing for controlling the supply of fuel delivered from said manifold to said drawer carried burner, and operating handles for said valves positioned exterior of the front wall of the drawer.

5. A construction such as defined in claim 3 wherein, a housing is formed in said drawer at the front end thereof for the reception of a fuel manifold and valves for controlling the flow of fuel from said manifold to said drawer carried burner, said housing being positioned beneath said grease collection trough, a flue in the rear end of said drawer, and an outlet stack extending upwardly from said drawer and in communication with said flue.

6. An improved cooking appliance comprising, a broiling chamber having a burner in the upper end thereof and provided with an opening at its front, a lower burner in said chamber and a broiling grid thereabove, a horizontally disposed trackway in said chamber mounted for vertical movement therein, said broiler grid supported on said trackway and horizontally movable thereon for movement in and out of the opening at the front of said chamber, an arm extending outwardly beyond the front of said broiling chamber and operatively connected to said trackway for imparting vertical movement thereto, a lock housing having therein a vertically elongated slot through which said extending arm passes, a handle on said arm for operating the same, said handle being movable longitudinally of said arm toward and away from said lock housing and provided with a lock head cooperating with said lock housing to support said trackway in any one of a plurality of its vertically adjustable positions, means for normally holding said lock head in locked relationship with said lock housing, and said handle being manually movable to release said lock head from said lock housing to permit vertical movement and adjustment of said trackway when desired.

7. A construction as defined in claim 3 wherein, the lower burner and the broiling grid and connected to a common carrier which is supported by and is horizontally movable on the trackway, whereby the lower burner and the broiling grid are movable as a unit both vertically in the broiling chamber and horizontally out of and into said chamber through the opening at the front of said chamber.

BENJAMIN E. MEACHAM
WILLIAM H. FRICK.